US009332469B2

(12) United States Patent
Davydov et al.

(10) Patent No.: US 9,332,469 B2
(45) Date of Patent: May 3, 2016

(54) FREQUENCY OFFSET MEASUREMENT ENHANCEMENTS FOR LONG TERM EVOLUTION (LTE)

(71) Applicants: Alexei Vladimirovich Davydov, Nizhny Novgorod (RU); Gregory Vladimirovich Morozov, Nizhny Novgorod (RU); Seunghee Han, Kyoungkido (KR); Alexander Alexandrovich Maltsev, Nizhny Novgorod (RU); Ilya Bolotin, Nizhny Novgorod (RU); Vadim Sergeyevich Sergeyev, Nizhny (RU); Jong-Kae Fwu, Sunnyvale, CA (US)

(72) Inventors: Alexei Vladimirovich Davydov, Nizhny Novgorod (RU); Gregory Vladimirovich Morozov, Nizhny Novgorod (RU); Seunghee Han, Kyoungkido (KR); Alexander Alexandrovich Maltsev, Nizhny Novgorod (RU); Ilya Bolotin, Nizhny Novgorod (RU); Vadim Sergeyevich Sergeyev, Nizhny (RU); Jong-Kae Fwu, Sunnyvale, CA (US)

(73) Assignee: Intel Corporation, Santa Clara, CA (US)

(*) Notice: Subject to any disclaimer, the term of this patent is extended or adjusted under 35 U.S.C. 154(b) by 82 days.

(21) Appl. No.: 14/125,767
(22) PCT Filed: Oct. 10, 2013
(86) PCT No.: PCT/US2013/064387
§ 371 (c)(1),
(2) Date: Dec. 12, 2013
(87) PCT Pub. No.: WO2014/070411
PCT Pub. Date: May 8, 2014

(65) Prior Publication Data
US 2015/0029874 A1   Jan. 29, 2015
Related U.S. Application Data

(60) Provisional application No. 61/721,436, filed on Nov. 1, 2012.

(51) Int. Cl.
H04B 7/208 (2006.01)
H04B 7/212 (2006.01)
(Continued)

(52) U.S. Cl.
CPC ............ *H04W 36/20* (2013.01); *H04B 7/0417* (2013.01); *H04B 7/0452* (2013.01);
(Continued)

(58) Field of Classification Search
CPC ..... H04W 36/20; H04W 36/14; H04W 28/24; H04W 52/0216; H04W 24/08; H04W 16/20; H04W 16/24; H04W 16/26; H04W 8/005; H04W 72/042; H04W 72/0413; H04W 72/0446; H04W 76/023; H04W 76/046; H04W 28/0268; H04W 52/0235; H04W 4/005; H04W 60/04; H04W 64/003; H04J 3/0614; H04L 5/0046; H04L 5/0048; H04L 61/30
USPC .................................. 370/342–345
See application file for complete search history.

(56) References Cited

U.S. PATENT DOCUMENTS 8,174,957 B2 * 5/2012 Ko ....................... H04B 7/0613
370/208

(Continued)

FOREIGN PATENT DOCUMENTS

EP         2369883 A1    9/2011
KR    1020120094369 A   8/2012

(Continued)

OTHER PUBLICATIONS

"U.S. Appl. No. 14/124,939, Preliminary Amendment filed Dec. 9, 2013", 9 pgs.

(Continued)

Primary Examiner — Thai Hoang
(74) Attorney, Agent, or Firm — Schwegman Lundberg & Woessner, P.A.

(57) ABSTRACT

Embodiments for providing frequency offset measurement enhancements are generally described herein. In some embodiments, user equipment is informed of a configuration of a first reference signal and a configuration of a second reference signal. The first reference signal is provided to user equipment for performing channel estimation. A second reference signal for estimating carrier frequency offset is provided, wherein the second reference signal is co-located with the first reference signal. A carrier frequency offset estimation is calculated based on the co-located first and second reference signals.

29 Claims, 10 Drawing Sheets

(51) Int. Cl.
| | | |
|---|---|---|
| *H04W 36/20* | (2009.01) | |
| *H04W 28/24* | (2009.01) | |
| *H04W 52/02* | (2009.01) | |
| *H04W 24/08* | (2009.01) | |
| *H04J 3/06* | (2006.01) | |
| *H04L 5/00* | (2006.01) | |
| *H04W 16/24* | (2009.01) | |
| *H04W 8/00* | (2009.01) | |
| *H04W 72/04* | (2009.01) | |
| *H04W 76/02* | (2009.01) | |
| *H04B 7/04* | (2006.01) | |
| *H04B 7/06* | (2006.01) | |
| *H04W 28/02* | (2009.01) | |
| *H04W 4/00* | (2009.01) | |
| *H04W 76/04* | (2009.01) | |
| *H04L 29/12* | (2006.01) | |
| *H04W 16/20* | (2009.01) | |
| *H04W 16/26* | (2009.01) | |
| *H04W 60/04* | (2009.01) | |
| *H04W 64/00* | (2009.01) | |
| *H04W 36/14* | (2009.01) | |

(52) U.S. Cl.
CPC .......... *H04B 7/0626* (2013.01); *H04J 3/0614* (2013.01); *H04L 5/0046* (2013.01); *H04L 5/0048* (2013.01); *H04L 61/3005* (2013.01); *H04L 61/3075* (2013.01); *H04W 4/005* (2013.01); *H04W 8/005* (2013.01); *H04W 16/20* (2013.01); *H04W 16/24* (2013.01); *H04W 16/26* (2013.01); *H04W 24/08* (2013.01); *H04W 28/0268* (2013.01); *H04W 28/24* (2013.01); *H04W 36/14* (2013.01); *H04W 52/0216* (2013.01); *H04W 52/0235* (2013.01); *H04W 60/04* (2013.01); *H04W 64/003* (2013.01); *H04W 72/042* (2013.01); *H04W 72/0413* (2013.01); *H04W 72/0446* (2013.01); *H04W 76/023* (2013.01); *H04W 76/046* (2013.01); *Y02B 60/50* (2013.01)

(56) References Cited

U.S. PATENT DOCUMENTS

| | | | | |
|---|---|---|---|---|
| 8,660,197 | B2* | 2/2014 | Lindgren | H04L 27/266 375/259 |
| 2001/0051994 | A1 | 12/2001 | Serizawa et al. | |
| 2008/0188247 | A1 | 8/2008 | Worrall | |
| 2011/0038326 | A1 | 2/2011 | Davies et al. | |
| 2011/0059744 | A1 | 3/2011 | Won et al. | |
| 2011/0110347 | A1 | 5/2011 | Mun | |
| 2011/0149728 | A1 | 6/2011 | Lee | |
| 2011/0190000 | A1 | 8/2011 | Kwun | |
| 2011/0244877 | A1 | 10/2011 | Farajidana et al. | |
| 2011/0310769 | A1 | 12/2011 | Lee et al. | |
| 2011/0319065 | A1 | 12/2011 | Dalsgaard et al. | |
| 2012/0033643 | A1* | 2/2012 | Noh | H04L 5/0048 370/335 |
| 2012/0039298 | A1* | 2/2012 | Lee | H04L 1/0079 370/330 |
| 2012/0093124 | A1* | 4/2012 | Zhang | H04L 5/0035 370/330 |
| 2012/0155406 | A1 | 6/2012 | Kim et al. | |
| 2012/0176885 | A1* | 7/2012 | Lee | H04J 13/0048 370/209 |
| 2012/0252518 | A1 | 10/2012 | Karampatsis et al. | |
| 2013/0039439 | A1* | 2/2013 | Kameya | H04L 5/0048 375/295 |
| 2013/0080597 | A1 | 3/2013 | Liao | |
| 2013/0089065 | A1* | 4/2013 | Koorapaty | H04W 56/001 370/330 |
| 2013/0170467 | A1* | 7/2013 | Ogawa | H04B 1/713 370/329 |
| 2013/0195070 | A1* | 8/2013 | Bashar | H04B 1/69 370/330 |
| 2013/0303206 | A1 | 11/2013 | Starsinic et al. | |
| 2014/0016614 | A1 | 1/2014 | Velev et al. | |
| 2014/0113667 | A1 | 4/2014 | Keller et al. | |
| 2014/0269779 | A1 | 9/2014 | Shan et al. | |
| 2014/0321296 | A1* | 10/2014 | Balraj | H04L 5/0032 370/252 |
| 2015/0092738 | A1* | 4/2015 | Chakraborty | H04L 5/0005 370/330 |
| 2015/0230214 | A1* | 8/2015 | Tong | H04L 1/00 370/329 |
| 2015/0304076 | A1* | 10/2015 | Lee | H04L 5/005 370/329 |
| 2015/0358931 | A1* | 12/2015 | Koorapaty | H04W 56/002 370/330 |

FOREIGN PATENT DOCUMENTS

| | | |
|---|---|---|
| KR | 1020120096408 A | 8/2012 |
| WO | WO-2012065033 A1 | 5/2012 |
| WO | WO-2012111937 A2 | 8/2012 |
| WO | WO-2012134579 A1 | 10/2012 |
| WO | WO-2012141884 A1 | 10/2012 |
| WO | WO-2014070411 A1 | 5/2014 |
| WO | WO-2014070649 A1 | 5/2014 |
| WO | WO-2014070901 A1 | 5/2014 |
| WO | WO-2014070929 A1 | 5/2014 |

OTHER PUBLICATIONS

"U.S. Appl. No. 14/126,611, Preliminary Amendment filed Dec. 16, 2013", 11 pgs.

"Evaluation of MTC Device triggering", HTC, TD S2-110732, 3GPP TSG SA WG2 Meeting #83, (Feb. 2011), 2 pgs.

"International Application Serial No. PCT/US2013/064387, International Search Report mailed Jan. 28, 2014", 4 pgs.

"International Application Serial No. PCT/US2013/064387, Written Opinion mailed Jan. 28, 2014", 4 pgs.

"International Application Serial No. PCT/US2013/067043, International Search Report mailed Feb. 25, 2014", 4 pgs.

"International Application Serial No. PCT/US2013/067043, Written Opinion mailed Feb. 25, 2014", 6 pgs.

"International Application Serial No. PCT/US2013/067522, International Search Report mailed Feb. 12, 2014", 3 pgs.

"International Application Serial No. PCT/US2013/067522, Written Opinion mailed Feb. 12, 2014", 6 pgs.

"International Application Serial No. PCT/US2013/067575, International Search Report mailed Feb. 21, 2014", 3 pgs.

"International Application Serial No. PCT/US2013/067575, Written Opinion mailed Feb. 21, 2014", 6 pgs.

"Triggering a detached MTC device", InterDigital Communications, TD S2-110673, 3GPP TSG SA WG2 Meeting #83, (Feb. 2011), 4 pgs.

"Evolved Universal Terrestrial Radio Access (E-UTRA); Radio Resource Control (RRC)", 3GPP TS 36.331 V11.4.0 (Jun. 2013) Technical Specification Group Radio Access Network; Protocol specification (Release 11), (Jun. 2013), 346 pgs.

"Evolved Universal Terrestrial Radio Access (E-UTRA); Radio Resource Control (RRC);", 3GPP TS 36.331 V11.1.0 (Sep. 2012) Technical Specification Group Radio Access Network; Protocol specification (Release 11), (Sep. 2012), 325 pgs.

"Evolved Universal Terrestrial Radio Access (E-UTRA); Study on signalling and procedure for interference avoidance for in-device coexistence", 3GPP TR 36.816 V11.1.0 (Sep. 2011) Technical Specification Group Radio Access Network (Release 11), (Sep. 2011), 44 pgs.

"Inter-RAT mobility for UE under IDC interference", 3GPP TSG-RAN WG2 #79bis; R2-124725; Agenda Item 7.6.3; LG Electronics Inc., (Oct. 8, 2012), 1 pg.

(56) References Cited

OTHER PUBLICATIONS

"Inter-RAT operation for in-device coexistence", 3GPP TSG RAN WG2 Meeting #80; R2-125750; Agenda Item 7.6.1; Intel Corporation, (Nov. 12, 2012), 2 pgs.

"Title Change Request", 3GPP TSG-RAN WG2 Meeting #79bis; R2-125108, (Oct. 8, 2012), 5 pgs.

Hong, Wei, et al., "Considering In-Device Coexistence interference from WiFi point of view", IEEE 802.11-13/0880-00, (Jul. 17, 2013), 13 pgs.

"3GPP MTC Standard TTA M2M Seminar", ETRI Standards Research Center, [Online] retrieved from the internet: <edu.tta.or.kr/sub3/down.php?No=123&file=M2M_1-4.pdf>, (Oct. 23, 2012).

"U.S. Appl. No. 14/126,611, Non Final Office Action mailed Oct. 23, 2014", 10 pgs.

"The Mobile Broadband Standard", 3GPP List of Work Items, [Online] retrieved from the internet: <http://www.3gpp.org/DynaReport/WI-List.html>.

* cited by examiner

FREQUENCY OFFSET MEASUREMENT ENHANCEMENTS FOR LONG TERM EVOLUTION (LTE)

This application is a U.S. National Stage Filing under 35 U.S.C. 371 from International Application No. PCT/US2013/064387, filed Oct. 10, 2013, which claims the benefit of priority to U.S. Provisional Patent Application Ser. No. 61/721,436, filed on Nov. 1, 2012, all of which are incorporated herein by reference in their entirety.

BACKGROUND

A step in downlink received signal processing in long term evolution (LTE) network is to synchronize the carrier frequencies between the transmitter and the receiver, e.g., between the base station (BS) or evolved nodeB (eNB) and the user equipment (UE) or mobile station (MS). This synchronization is performed to enable the UE/MS to decode the signal from the eNB/BS. Herein the terms eNB will also be used to refer to a BS, an access point, etc. The term UE will also be used to refer to a MS, mobile device, cellular phone, etc. Carrier frequency offset (CFO) estimation and compensation scheme may be performed by the UE based on standardized reference symbols.

Currently, the reference signals often used for this purpose are cell-specific reference signals (CRS) that are defined in the LTE standard. However, with the introduction of coordinated multipoint processing (CoMP) techniques, CRS signals have become less applicable for CFO estimation because there may be some cases when several neighboring eNBs transmit the same CRS waveform, e.g., in CoMP scenario 4, where low-power remote radio heads (RRHs) within the coverage of the high-power macro cell may operate with the same cell ID, e.g. as the Macro cell. When several neighboring eNBs transmit the same CRS waveform, CFO estimation for each eNB becomes difficult, i.e., multiple eNBs may use carrier frequencies that are too close to one another. The UE cannot determine which eNB sent which CRS waveform when two CRS waveforms are the same. Another drawback of using CRS signals for CFO estimation is the lack of the ability to manage interference on the CRS signals for CoMP techniques. This results in poor quality of the received CRS signals. Interference causes errors in the estimation processes. This prevents the UE from tuning to the proper frequency.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass available equivalents of those claims.

Moreover a first reference signal may correspond to a reference signal used to identify the data transmission from an eNB (or the eNB). A second reference signal may be used to measure the carrier frequency offset. In one embodiment this is a positioning reference signals (PRS). In another embodiment, the second reference signal may be a CSI-RS configured to be transmitted from one antenna. In yet another embodiment, the second reference signal may requires addition of a third reference signal, which may be a repetition of the second reference signal at one or more timing offsets respectively.

With some types of reference signals, the LTE-A standard provides muting functionality. Muting functionality allows interference to be reduced on particular reference signals to increase the accuracy of appropriate measurements. In contrast, for CRS signals the muting functionality is not defined in the LTE-A for the sake of backward compatibility. To improve the carrier frequency offset estimation accuracy for downlink CoMP where the PDSCH transmission originates from different transmission points with different CFO, methods for performing frequency offset measurements according to an embodiment are provided. A plurality of reference signals is used. The plurality of reference signals may include positioning reference signals (PRS) and demodulation reference signals (DM-RS). Also an enhanced configuration for channel state information reference signals (CSI-RS) signals is provided for adapting CSI-RS signals for CFO estimation.

Figure 1:
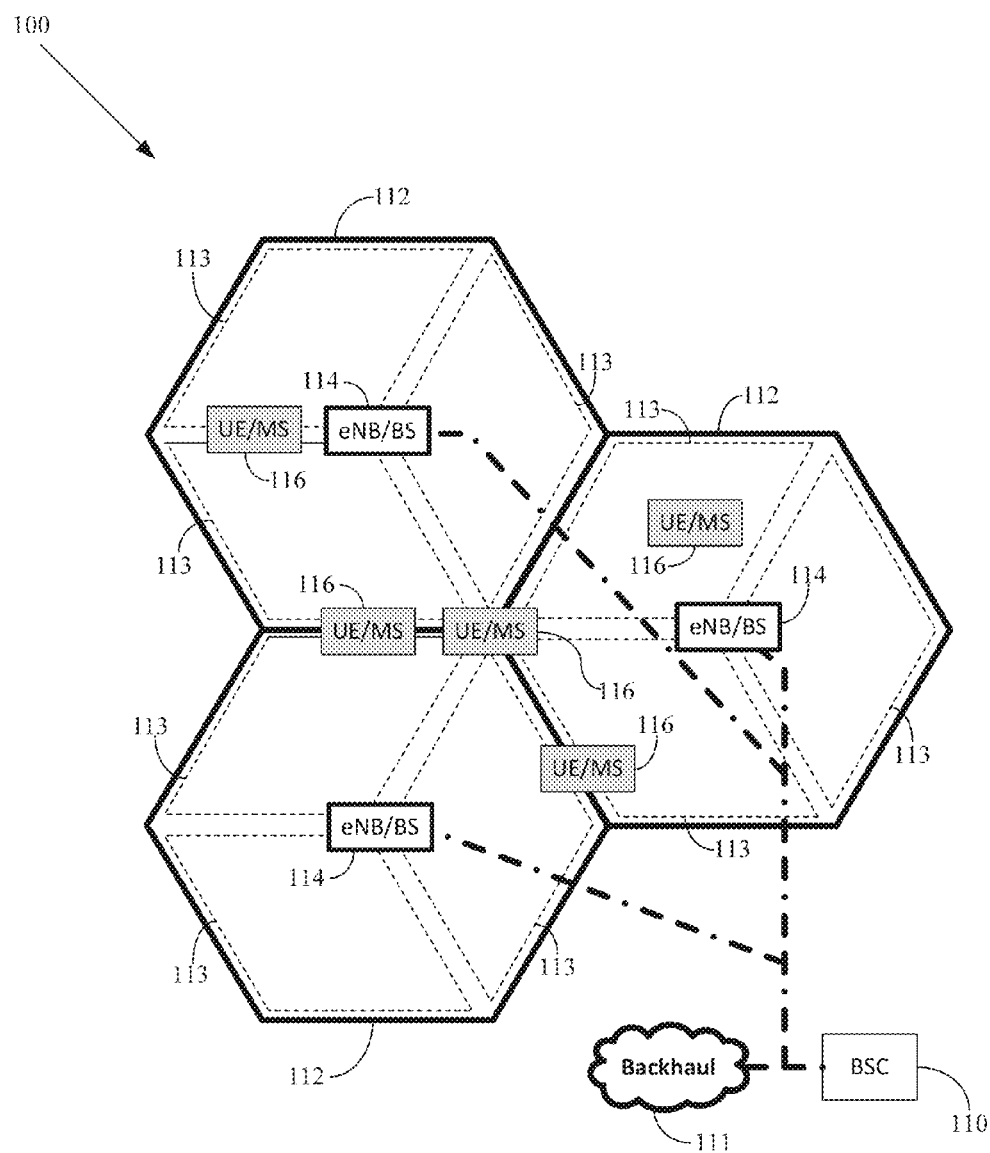
FIG. 1 shows a wireless communications system according to an embodiment.

FIG. 1 shows a wireless communications system 100 according to an embodiment. A base station controller (BSC) 110 controls wireless communications within multiple cells 112, which cells are served by corresponding base stations (BS) 114. In some configurations, each cell is further divided into multiple sectors 113 or zones (not shown). In general, each base station 114 facilitates communications using OFDM with mobile and/or wireless terminals 116, which are within the cell 112 associated with the corresponding base station 114. The movement of the mobile terminals 116 in relation to the base stations 114 results in significant fluctuation in channel conditions. Although not shown in FIG. 1, the base stations 114 and mobile terminals 116 may include multiple antennas to provide spatial diversity for communications.

Wireless terminals 116 can be handed off from any cell 112, sector 113, zone (not shown), base station 114 to another cell 112, sector 113, zone (not shown), or base station 114. In some configurations, base stations 114 communicate with each other and with another network (such as a core network or the internet, both not shown) over a backhaul network 111. In some configurations, a base station controller 110 is not used.

Figure 2:
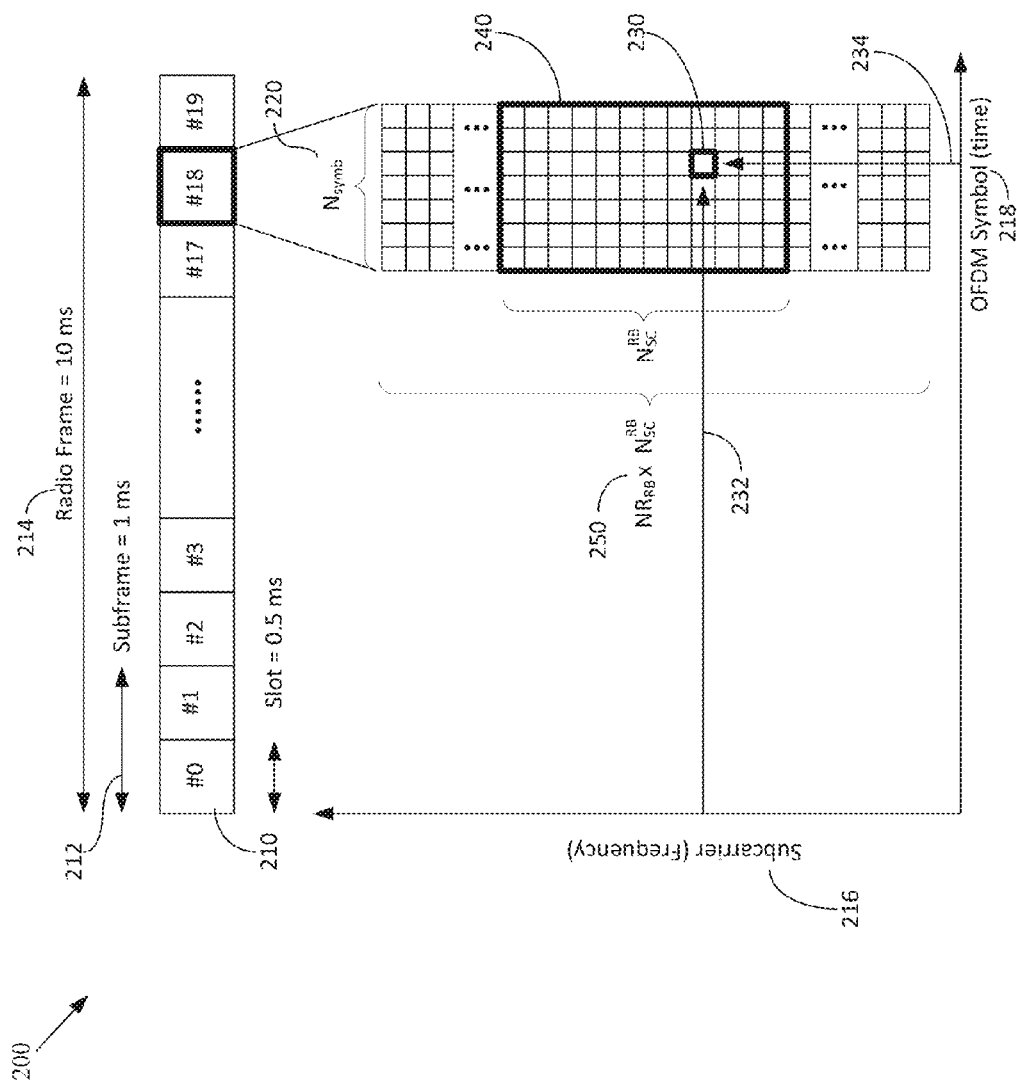
FIG. 2 illustrates a frame structure according to an embodiment.

FIG. 2 illustrates a frame structure 200 according to an embodiment. In FIG. 2, the frame 214 has an overall length of 10 ms. This is then divided into a total of 20 individual slots 210. Each subframe 212 includes two slots 210 of length 0.5 ms, and each slot 210 contains a number of OFDM symbols, $N_{symb}$ 220. Thus, there are 10 subframes 212 within a frame 214. Subframe #18 is shown expanded with reference to a subcarrier (frequency) axis 216 and an OFDM symbol (time) axis 218.

A resource element (RE) 230 is the smallest identifiable unit of transmission and involves one subcarrier 232 for an OFDM symbol period 234. Transmissions are scheduled in larger units called resource blocks (RBs) 240 which comprise a number of adjacent subcarriers 232 for a period of one 0.5-ms timeslot. Accordingly, the smallest dimensional unit for assigning resources in the frequency domain is a "resource block" (RB) 240, i.e., a group of $N_{SC}^{RB}$ adjacent subcarriers 232 constitute a resource block (RB) 240. Each subframe 212 includes "n" resource blocks, i.e., $N_{RB} \times N_{SC}^{RB}$ 250.

Figure 3:
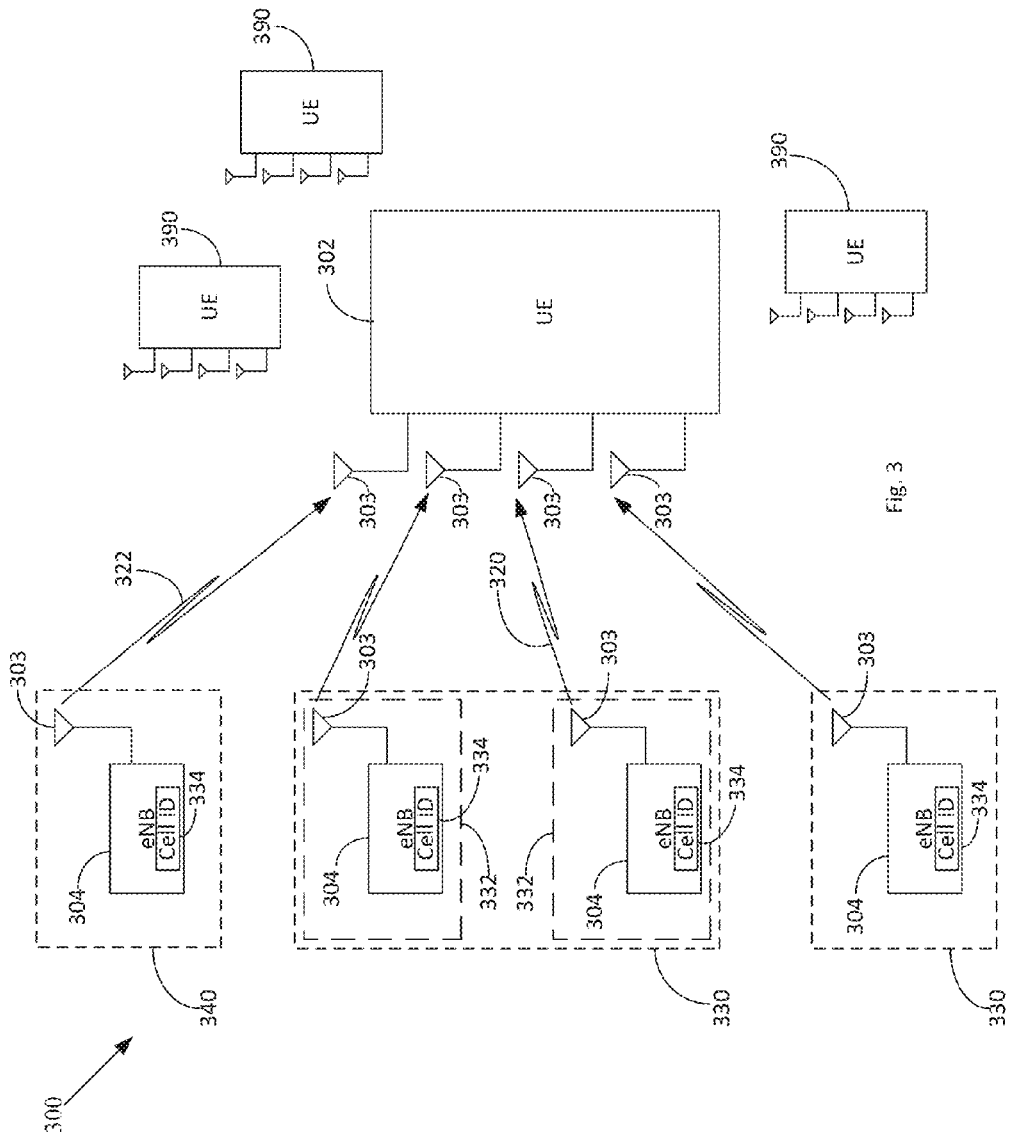
FIG. 3 illustrates a wireless communication network according to an embodiment.

FIG. 3 illustrates a wireless communication network according to an embodiment. Wireless network 300 comprises at least one UE 302 in a cell and one or more eNBs 304. Each eNB may serve a cell 330 or a sector 332 within a cell 330. Coordinated multiple point transmission/reception (CoMP) allows a UE 302 to transmit or receive signals from multiple points jointly, e.g., cells 330, sectors 332, etc.

An eNB 304 may provide for communications between associated UEs 302, 390 and may allow UEs 302, 390 to communicate with one or more external networks, such as the Internet. UE 302 and eNBs 304 may comprise multiple-input multiple-output (MIMO) communication stations which use a plurality of antennas 303 for communicating. However, in FIG. 3, eNBs 304 are illustrated with a single antenna and UE 302 is illustrated with four antennas. Those of ordinary skill in the art will recognize that the scope of the embodiments described herein is not meant to be limited in this respect. Nevertheless, UE 302 and eNBs 304 may have two or more antennas.

An eNB 304 may employ a multi-user link with more than one of UE 302. Applications may be arranged to use particular quality-of-service (QOS) levels. Quality-of-service level may include data rates, error rate and/or packet priority to be used. The QoS level may be based on the information content of the communications.

In LTE or LTE-A compliant systems, there exist multiple component carriers (CC) for carrier aggregation. For each component carrier, there are multiple physical/transport channels for each CC in the downlink, including: Physical broadcast channel (PBCH) carrying the broadcast channel (PCH), Physical downlink shared channel (PDSCH) carrying the down-link shared channel (DL-SCH) and paging channel (PCH), Physical multicast channel (PMCH) carrying the multicast channel (MCH), Physical downlink control channel (PDCCH) carrying DCI information, Physical control format indicator channel (PCFICH) carrying CFI information, and Physical hybrid ARQ indicator channel (PHICH) carrying HI information.

A downlink reference signal (RS) 320 may include a cell-specific RS (CRS), a UE-specific RS, a positioning RS (PRS), and a channel state information (CSI) RS (CSI-RS). The CRS is an RS transmitted to the UEs 302 in a cell 330, and can be used in both data demodulation and channel estimation. The CRS can be transmitted in downlink subframes in a cell 330 supporting PDSCH transmission. The UE-specific RS is an RS received by a specific UE 302 or a specific UE group in the cell 330, and can also be called a dedicated RS (DRS). Alternatively, the UE-specific RS can also be called a demodulation RS (DM-RS) since it is primarily used in channel estimation and data demodulation.

The DM-RS signal may be used by the UE 302 to perform channel estimation for demodulation of the PDCCH and other common channels, as well as for measurement and feedback. A CSI-RS signal may be used to measure the channel status, especially for multiple antennas cases. In addition, other feedback information may be based on the measurement of CSI-RS. While supporting the same number of antenna ports as the CRS signal, the CSI-RS signal uses much less overhead due to its low density in time and frequency. The CSI-RS signal pattern is transmitted to the UE 302 using a radio resource control (RRC) signal.

To reduce the interference caused by the CSI-RS signals 322 of neighbor cells 340, eNBs 304 may mute the PDSCH transmission. In other words, the PDSCH transmission may transmit nothing in the muted resource elements indicated by the muting pattern. Since there is signaling that informs a UE 302 of the muting pattern, the UE 302 may discard the muted resource elements in the reception of PDSCH.

When carrier aggregation is utilized, the UE 302 and eNB 304 may communicate using two or more component carriers (CC). The UE 302 may concurrently receive downlink data packets from two or more receive antennas from two or more eNBs 304 on the same frequency subcarriers of a multicarrier communication channel. In these embodiments, UE 302 may internally separate the downlink data transmitted by the two or more eNBs 304 using channel estimates for each transmitting station from which a transmission is received.

UE 302 may generate channel estimates and carrier frequency offset (CFO) estimates for each of eNBs 304 from signals received from the eNBs 304, e.g., by performing an iterative decoding process using previously generated channel estimates and previously generated CFO estimates to cancel inter-carrier interference (ICI) from the received signals. The ICI may result from a loss of subcarrier orthogonality induced by carrier frequency offsets. UE 302 may correct its carrier frequency according to the CFO estimate. According to some embodiments, UE 302 and eNBs 304 may include both transmitting and receiving functionality. However, each eNB 304 may use the same frequency for reference signals (RS) that are used for CFO estimation. This may lead to interference between the cells because the UE receives a mixture of signals. The overlap of frequencies causes errors in the CFO estimation process. UE 302 may compensate for CFO by performing CFO estimation measurements.

Figure 4:
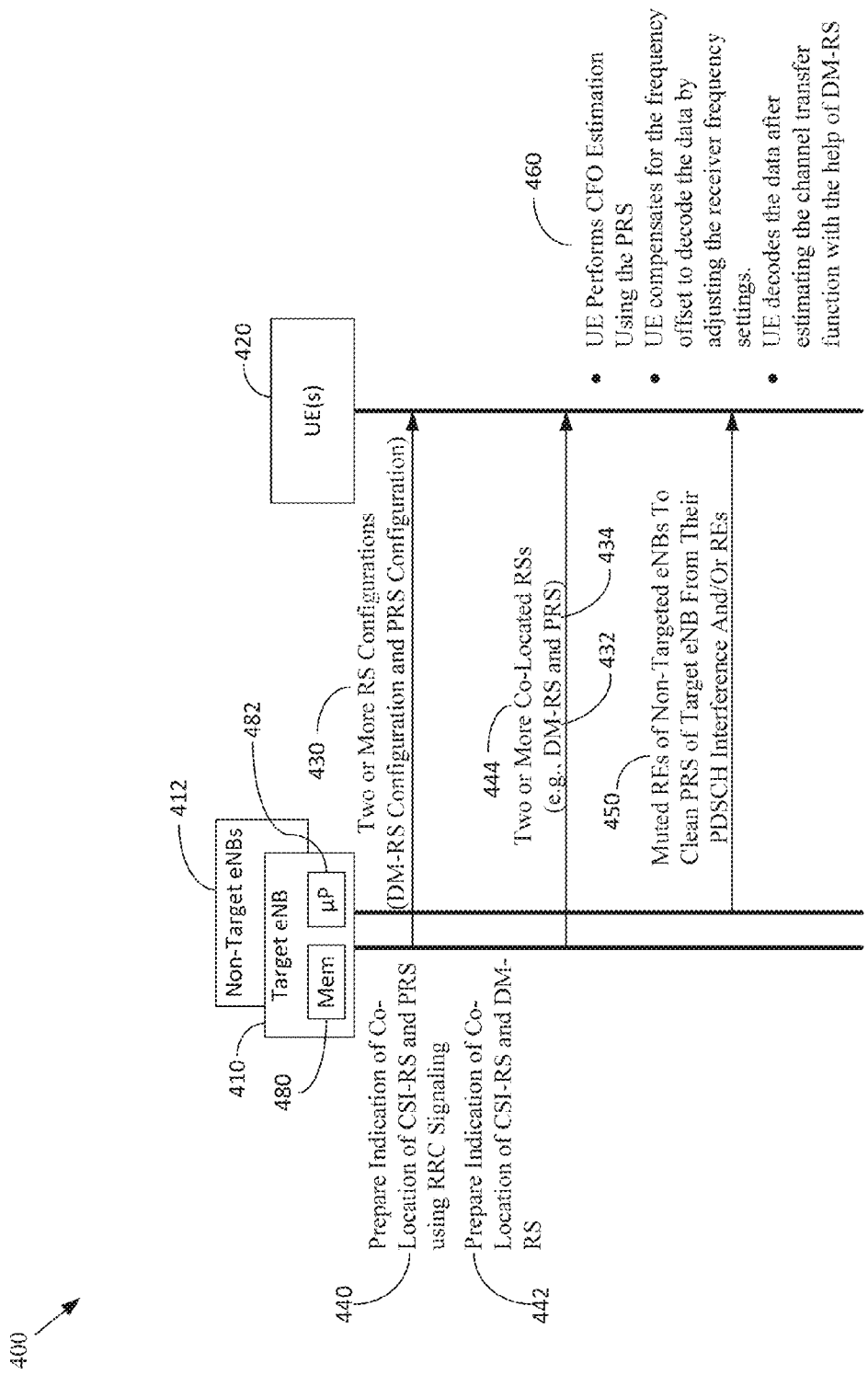
FIG. 4 illustrates CFO estimation according to an embodiment.

FIG. 4 illustrates CFO estimation 400 according to an embodiment. CFO estimation 400 is provided using existing positioning reference signals (PRS) and data modulation reference signals (DM-RS) to perform CFO estimation. PRS signals have enough density in both time and frequency to allow accurate CFO estimation. Other eNBs are configured in such a way so their transmissions do not interfere with the PRS signals.

To transmit signals between devices, such as a mobile phone, a computer, or any remotely controlled machine, a radio access network (RAN) is defined to provide connections between devices and a core network (CN). RAN Working Group 1 (WGI), also referred to as RAN1, is responsible for radio layer 1, which is the physical layer of the radio interface for UE, Universal Terrestrial Radio Access Network (UTRAN), Evolved UTRAN, and beyond; covering both the frequency division duplex, (FDD) and time division duplex (TDD) modes of the radio interface.

According to ETSI technical specification, 3GPP TS 36.213 version 11.2.0, Release 11 (2013-04), a UE may use a parameter set for specifying antenna ports and conditions where antenna ports may be assumed to be quasi co-located. Two antenna ports are said to be quasi co-located if the large-scale properties of the channel over which a symbol on one antenna port is conveyed can be inferred from the channel over which a symbol on another antenna port is conveyed. The large-scale properties may include one or more of delay spread, Doppler spread, Doppler shift, average gain, and average delay. Under this specification, a UE does not assume that two antenna ports are quasi co-located unless specified otherwise.

In LTE, different types of reference signals, e.g., the PRS, the CSI-RS, the DM-RS, etc., are transmitted from different antenna ports (logical antennas), which may be mapped to the same or different physical antennas, depending on the eNB implementation. Co-location between reference signals in some cases may be viewed as a transmission of reference signals from antennas of the same eNB, which are geographically close to each other.

The receiver of the UE may reuse parameters of the received signal estimated over one type of RS to process another type of RS. For example, when a UE is informed of co-location of a particular configuration of DM-RS and a particular configuration of PRS, the UE may first estimate the frequency offset between itself and the eNB over PRS signals and then apply this estimate to demodulate data sent along with the DM-RS. In opposite case, when the UE knows that particular configurations of DM-RS and PRS are not co-located, the UE may assume that these signals come from different eNBs and therefore the frequency offset estimated for one of the eNBs cannot be applied to data received from another eNB because the offsets may be different.

LTE takes a more formal approach to define co-location. In LTE, co-location is defined with respect to particular signal/channel properties that can be estimated over one of the RS and then applied in the processing part that uses another RS. For example, the signals may be co-located with respect to frequency offset, e.g., the frequency offset if measured over either of them will be the same because antenna ports transmitting these signals operate based on the same oscillator, but not for channel delay spread, for example, because physical antenna locations for corresponding antenna ports may be different.

As shown in FIG. 4, an eNB 410 sends the UE 420 a signal 430 to inform the UE 420 of at least a configuration for a DM-RS 432 and one configuration for a PRS 434. The eNB includes memory 480 for storing data and a processor 482 for providing frequency offset measurement enhancements according to an embodiment. The co-location of at least a DM-RS 432 and the PRS 434 may be signaled to the UE 420 to assist the UE 420 with CFO estimation on a downlink channel DM-RS based transmission. The signaling of co-location of DM-RS 432 and PRS 434 to the UE 420 may be made by indicating co-location of CSI-RS and PRS using RRC signaling 440 in conjunction with CSI-RS and DM-RS co-location 442. The eNB 410 transmits to the UE 420 the two or more co-located RSs 444, e.g., co-located DM-RS 432 and PRS 434. Other eNBs 412 may mute their RE 450 to clean PRS of eNB 410 from their physical downlink shared channel (PDSCH) interference and/or reference signals. The UE 420 performs CFO estimation 460 using the PRS 434. The UE 420 compensates for the frequency offset to be able to decode the data by adjusting the receiver frequency settings. Then the UE 420 may decode the data. One of the steps of data decoding is the channel equalization. For this purpose the channel transfer function is estimated with the help of DM-RS 432, and this estimate is used to compensate for the channel in the receiver of the UE 420. Then the data may be decoded by the UE 420.

Figure 5:
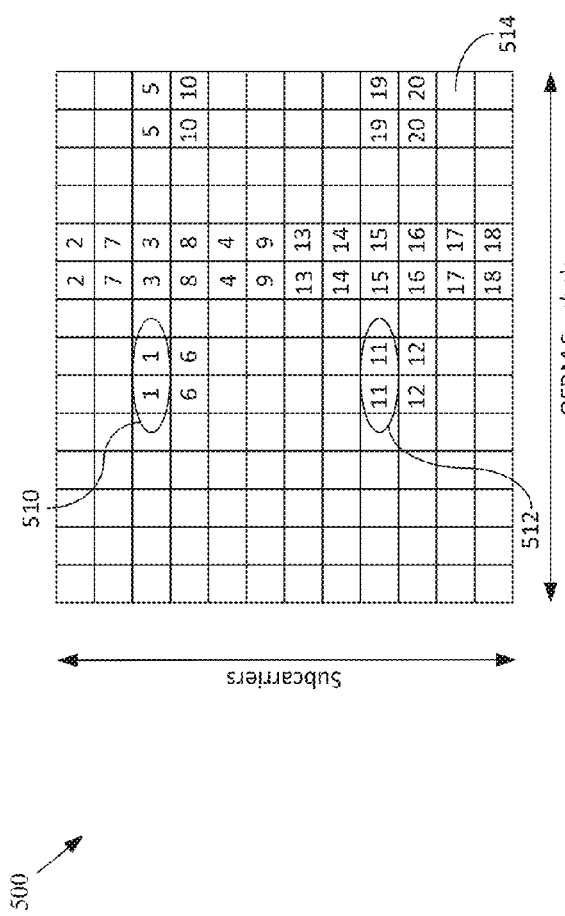
FIG. 5 illustrates a physical resource block (PRB) according to an embodiment.

FIG. 5 illustrates a physical resource block (PRB) 500 according to an embodiment. In FIG. 5, CSI-RS 510, 512 are shown periodically mapped onto pairs of consecutive OFOM symbols 514. CSI-RS 510, 512 signals may be used for CFO estimation because, for CSI-RS 510, 512, PDSCH muting is defined. PDSCH muting may be used to clear the CSI-RS 510, 512 from PDSCH interference. However, the structure of existing CSI-RS 510, 512 is poorly suited for CFO estimation because of the time configuration properties of the CSI-RS 510, 512. This is demonstrated in FIG. 6.

Figure 6:
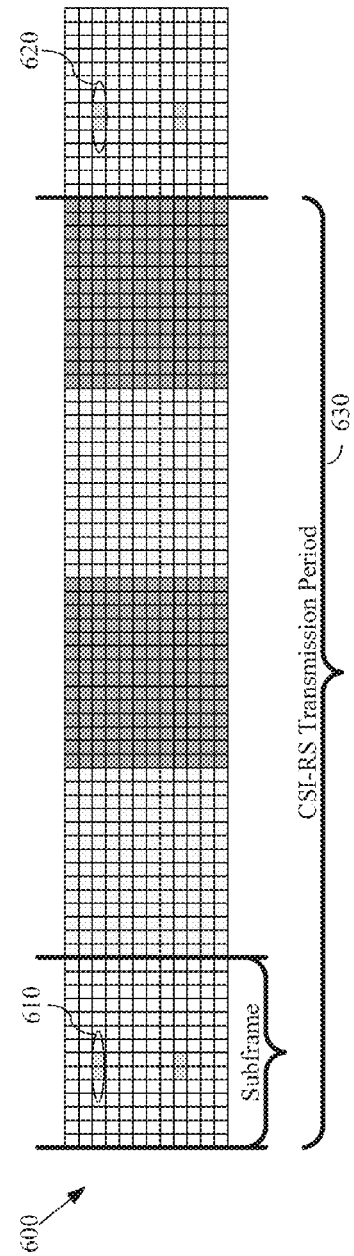
FIG. 6 illustrates a CSI-RS transmission period according to an embodiment.

FIG. 6 illustrates a CSI-RS transmission of subframes 600 according to an embodiment. In FIG. 6, one pair of CSI-RS resource elements 610 is shown separated from another pair of CSI-RS resource elements 620 by a substantial time interval 630, e.g., greater than 5 ms. Assuming that the CFO estimation is performed by tracking the phase of the CSR-RS signals from one OFDM symbol pair 610 to another 620, the substantial time interval separating the pairs creates ambiguity in the estimate because the time interval 630 does not allow distinguishing phase shift values that are different by 2*PI. For example, phase shifts of 0*π and 2*π are indistinguishable for the estimation algorithm, which, assuming the 5 ms periodicity of CSI-RS, makes the CFO of slightly greater than 200 Hz indistinguishable from that of close to 0 GHz. With longer periods 630 of CSI-RS transmission, even less significant CFO values, e.g., 100 Hz for 10 ms periodicity, cause estimation ambiguity.

Figure 7:
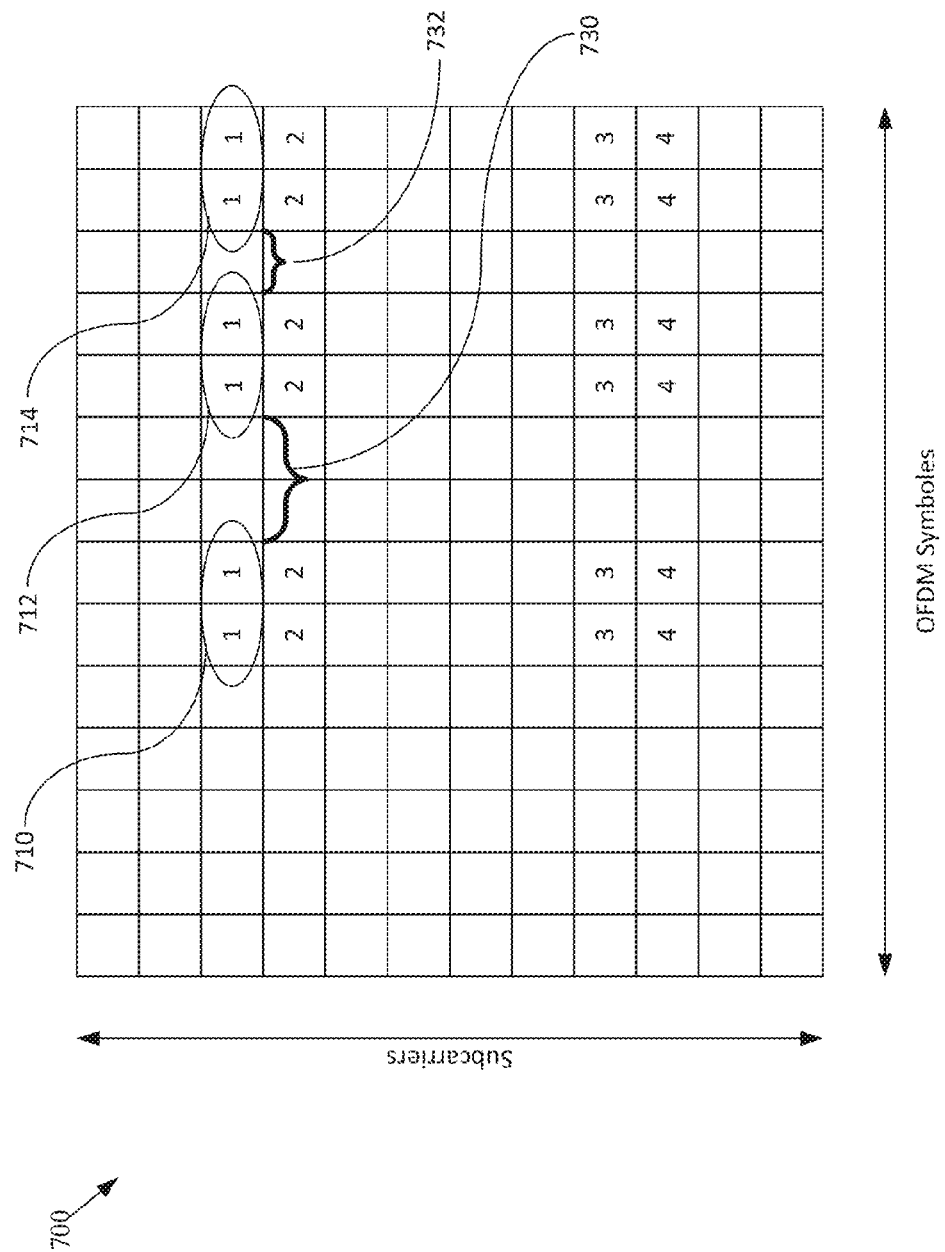
FIG. 7 illustrates a PRB according to an embodiment.

FIG. 7 illustrates a PRB 700 according to an embodiment. In FIG. 7, a plurality of CSI-RS 710, 712, 714 are spaced at different intervals 730, 732 according to an embodiment. The varying intervals 730, 732 between the CSI-RS 710, 712, 714 for CFO estimation dramatically minimize the inter-OFDM symbol pair distance. Thus, several sets of CSI-RS resource elements 710, 712, 714 may be transmitted from the same eNB to provide a UE an opportunity to track the phase shift on a single subframe 700. The third CSI-RS 714 may be a copy of one or more of the second CSI-RS 712.

Figure 8:
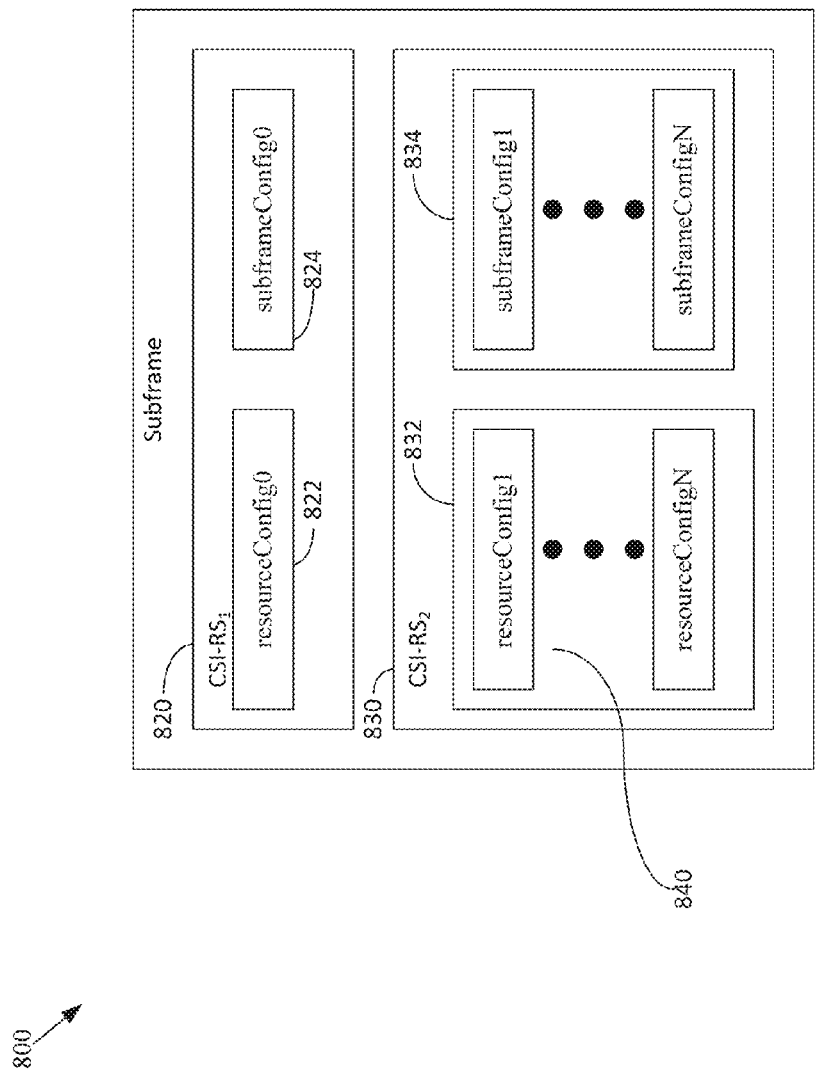
FIG. 8 illustrates the use of more than one CSI-RS configuration in a subframe according to an embodiment.

FIG. 8 illustrates the use of more than one CSI-RS configuration in a subframe 800 according to an embodiment. In FIG. 8, subframe 800 is shown with two CSI-RS, i.e., CSI-RS1 820, CSI-RS2 830. Thus, there may be N CSI-RSs, wherein each has its own resource and subframe configuration. The N CSI-RSs may all be used for calculation of the same frequency offset. As an example, the N CSI-RSs may correspond to CSI-RSs 710, 712, 714 shown in FIG. 7.

Legacy UEs that work in accordance with existing versions of the LTE standard may try to decode data from some of the REs used by newly configured CSI-RS1 820 or CSI-RS2 830. To make the legacy UEs avoid picking data from the newly configured CSI-RS1 820, for example, zero-power CSI-RS provided in legacy LTE versions may be configured. In particular, the bitmap used to indicate the REs occupied by zero-power CSI-RS may be configured such that REs used for newly configured CSI-RS are covered by the bitmap.

Figure 9:
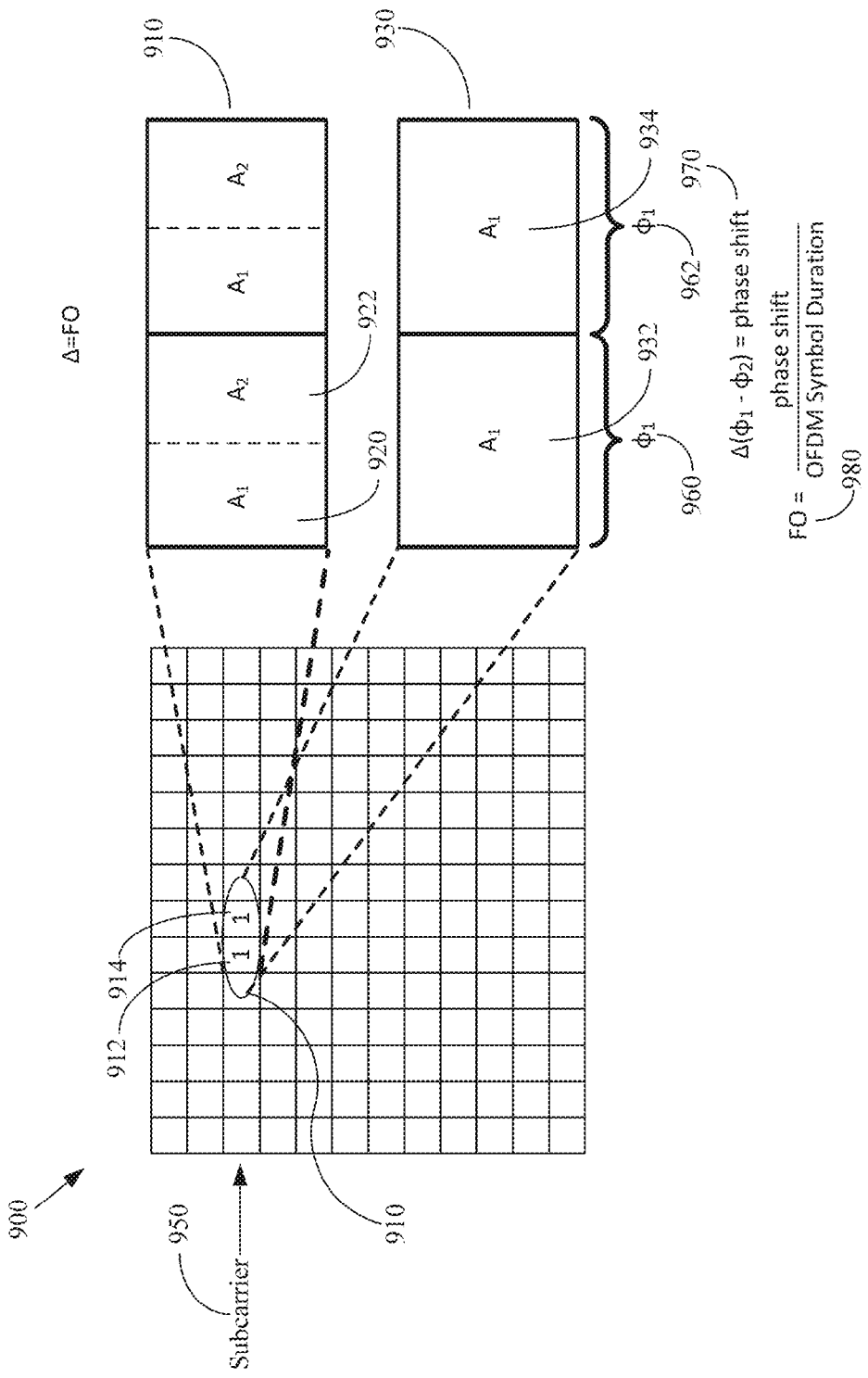
FIG. 9 illustrates a resource block for performing frequency offset estimation according to an embodiment.

FIG. 9 illustrates a resource block 900 for performing frequency offset estimation according to an embodiment. In FIG. 9, resource block 900 includes CSI-RS1 910. CSI-RS1 910 is shown in more detail on the right. CSI-RS1 910 includes a pair of two consecutive OFDM symbols 912, 914. The resource block 900 for performing frequency offset estimation according to an embodiment overcomes the issue of code division multiplexing (CDM) coding applied to CSI-RS signals.

To be able to measure the frequency offset between a receiver and a transmitter, the receiver uses at least two samples of the signal coming from one antenna. The samples are taken with some time interval between them. Since CSI-RS signals are always mapped onto symbol pairs, such as symbol pair 912, 914, in the same subcarrier 950, the receiver may measure the signal phase on each of the symbols 912,914 in CSI-RS1 910, for example, to derive the frequency offset from the signal phase shift between the OFDM symbols 912, 914.

However, when an eNB has more than one antenna, the pair of OFDM symbols in one subcarrier often carries the signals from two antennas. The signals are multiplexed in accordance with code division multiplexing algorithm. Referring to CSI-RS 910 on the right, FIG. 9 shows that each of OFDM symbols 912, 914 includes a mixture of signals coming from two antennas, A1 920, A2 922, wherein each signal passes through its own channel and receives its own phase shift in the channel. Accordingly, the receiver determines three independent variables, i.e., the phase shift caused by frequency offset, the phase shift in the first channel, and the phase shift in the second channel. The determination of the three independent variables is based on two observations, symbols 912, 914, which is obviously insufficient. For the task to become solvable the number of observations may be increased or the number of variables may be decreased. However, the approach based on increasing the number of observations taken in accordance with the current CSI-RS design may result in ambiguity as was explained earlier.

Thus, according to an embodiment, the number of variables is decreased to take advantage of the fact that LTE specification allows configuring a UE to watch (process) several CSI-RS signals simultaneously. For example, 3 CSI configurations may be processed simultaneously, for which the UE may assume non-zero power for 3 CSI configurations.

According to an embodiment, CSI-RS 930 may be configured as if it was transmitted from one antenna, regardless of the actual number of antennas at the eNB of the cell. The configuration of CSI-RS 930 is defined for one antenna at the eNB and thus has no code division multiplexing applied to it. Therefore, the receiver in the UE has the opportunity to estimate the phase for each of the OFDM symbols 932, 934 in the pair. Then, the UE may subtract one phase shift 960 from the other 962 to cancel out the phase shift resulting from the channel. The resulting value, A, corresponds to the phase shift 970 between the UE and the eNB. The frequency offset 980 then may be calculated by dividing the resulting phase difference 970 by the OFDM symbol duration. Accordingly, an embodiment allows the frequency offset of practical value to be estimated without the previous ambiguity.

Figure 10:
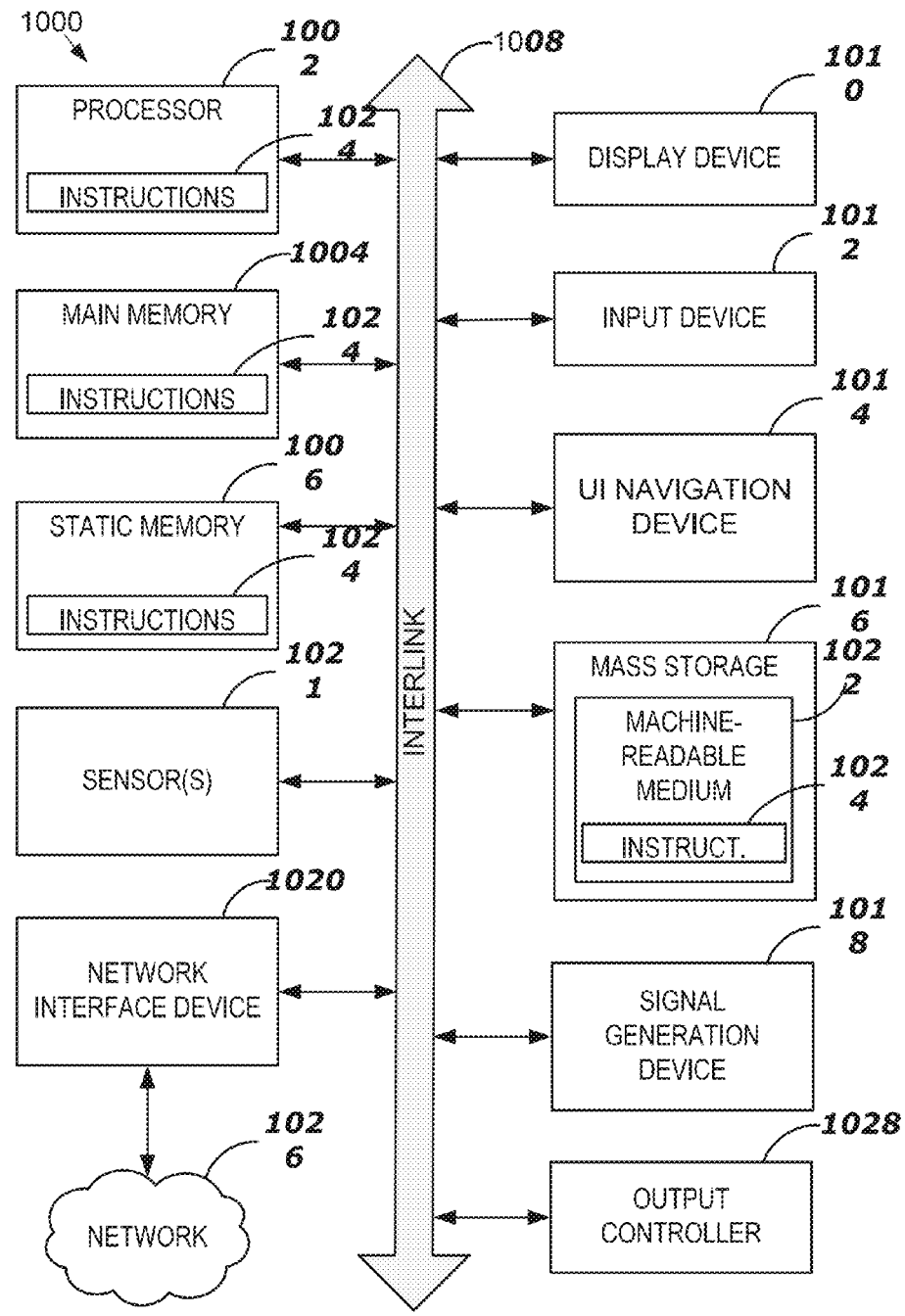
FIG. 10 illustrates a block diagram of an example machine for providing enhanced interference measurements with CSI feedback according to an embodiment.

FIG. 10 illustrates a block diagram of an example machine 1000 for providing frequency offset measurement enhancements for long term evolution (LTE) according to an embodiment upon which any one or more of the techniques (e.g., methodologies) discussed herein may perform. In alternative embodiments, the machine 1000 may operate as a standalone device or may be connected (e.g., networked) to other machines. In a networked deployment, the machine 1000 may operate in the capacity of a server machine and/or a client machine in server-client network environments. In an example, the machine 1000 may act as a peer machine in peer-to-peer (P2P) (or other distributed) network environment. The machine 1000 may be a personal computer (PC), a tablet PC, a set-top box (STB), a Personal Digital Assistant (PDA), a mobile telephone, a web appliance, a network router, switch or bridge, or any machine capable of executing instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, at least a part of one or more computer systems (e.g., a standalone, client or server computer system) or one or more hardware processors 1002 may be configured by firmware or software (e.g., instructions, an application portion, or an application) as a module that operates to perform specified operations. In an example, the software may reside on at least one machine readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform at least part of any operation described herein. Considering examples in which modules are temporarily configured, a module need not be instantiated at any one moment in time. For example, where the modules comprise a general-purpose hardware processor 1002 configured using software; the general-purpose hardware processor may be configured as respective different modules at different times. Software may accordingly configure a hardware processor, for example, to constitute a particular module at one instance of time and to constitute a different module at a different instance of time. The term "application," or variants thereof, is used expansively herein to include routines, program modules, programs, components, and the like, and may be implemented on various system configurations, including single-processor or multi-processor systems, microprocessor-based electronics, single-core or multi-core systems, combinations thereof, and the like. Thus, the term application may be used to refer to an embodiment of software or to hardware arranged to perform at least part of any operation described herein.

Machine (e.g., computer system) 1000 may include a hardware processor 1002 (e.g., a central processing unit (CPU), a graphics processing unit (GPU), a hardware processor core, or any combination thereof), a main memory 1004 and a static memory 1006, at least some of which may communicate with others via an interlink (e.g., bus) 1008. The machine 1000 may further include a display unit 1010, an alphanumeric input device 1012 (e.g., a keyboard), and a user interface (UI) navigation device 1014 (e.g., a mouse). In an example, the display unit 1010, input device 1012 and UI navigation device 1014 may be a touch screen display. The machine 1000 may additionally include a storage device (e.g., drive unit) 1016, a signal generation device 1018 (e.g., a speaker), a network interface device 1020, and one or more sensors 1021, such as a global positioning system (GPS) sensor, compass, accelerometer, or other sensor. The machine 1000 may include an output controller 1028, such as a serial (e.g., universal serial bus (USB), parallel, or other wired or wireless (e.g., infrared (IR)) connection to communicate or control one or more peripheral devices (e.g., a printer, card reader, etc.).

The storage device 1016 may include at least one machine readable medium 1022 on which is stored one or more sets of data structures or instructions 1024 (e.g., software) embodying or utilized by any one or more of the techniques or functions described herein. The instructions 1024 may also reside, at least partially, additional machine readable memories such as main memory 1004, static memory 1006, or within the hardware processor 1002 during execution thereof by the machine 1000. In an example, one or any combination of the hardware processor 1002, the main memory 1004, the static memory 1006, or the storage device 1016 may constitute machine readable media.

While the machine readable medium 1022 is illustrated as a single medium, the term "machine readable medium" may include a single medium or multiple media (e.g., a centralized or distributed database, and/or associated caches and servers) that configured to store the one or more instructions 1024.

The term "machine readable medium" may include any medium that is capable of storing, encoding, or carrying instructions for execution by the machine 1000 and that cause the machine 1000 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 1024 may further be transmitted or received over a communications network 1026 using a transmission medium via the network interface device 1020 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks ((e.g., channel access methods including Code Division Multiple Access (CDMA), Time-division multiple access (TDMA), Frequency-division multiple access (FDMA), and Orthogonal Frequency Division Multiple Access (OFDMA) and cellular networks such as Global System for Mobile Communications (GSM), Universal Mobile Telecommunications System (UMTS), CDMA 2000 1x* standards and Long Term Evolution (LTE)), Plain Old Telephone (POTS) networks, and wireless data networks (e.g., Institute of Electrical and Electronics Engineers (IEEE) 802 family of standards including IEEE 802.9 standards (WiFi), IEEE 802.16 standards (WiMax®) and others), peer-to-peer (P2P) networks, or other protocols now known or later developed.

For example, the network interface device 1020 may include one or more physical jacks (e.g., Ethernet, coaxial, or phone jacks) or one or more antennas to connect to the communications network 1026. In an example, the network interface device 1020 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 1000, and includes digital or analog communications signals or other intangible medium to facilitate communication of such software.

Figure 11:
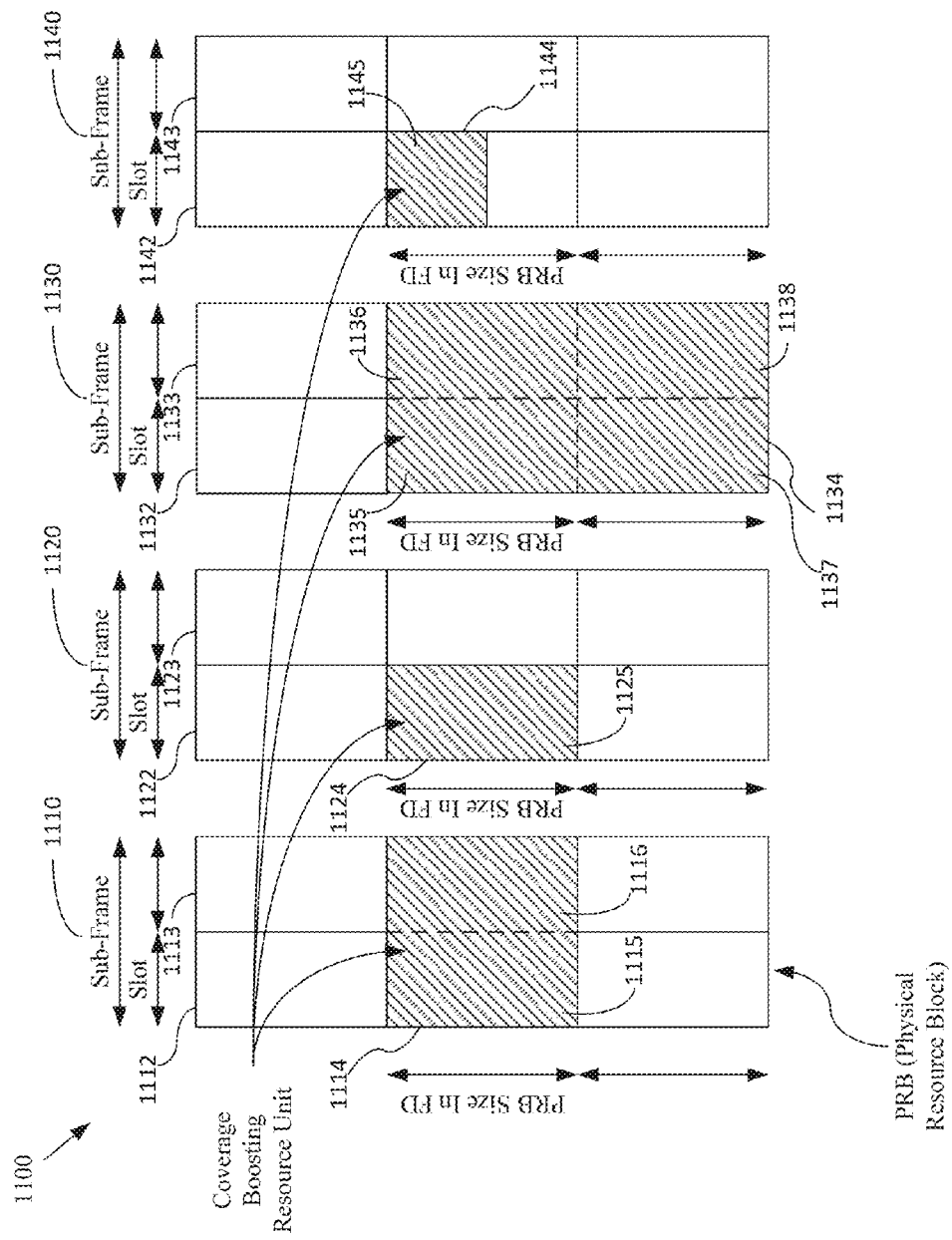
FIG. 11 illustrates coverage boosting resource unit (CBRU) configurations according to an embodiment.

FIG. 11 illustrates coverage boosting resource unit (CBRU) configurations 1100 according to an embodiment. In FIG. 11, four sub-frames 1110, 1120, 1130, 1140 are shown. Each of the four sub-frames 1110, 1120, 1130, 1140 includes two slots 1112/313, 1122/323, 1132/333, 1142/343, respectively. The slots 1112, 1113, 1122, 1123, 1132, 1133, 1142, 1143 each represent 5 milliseconds in the time domain. In sub-frame 1110, the CBRU 1114 is spread over two resource blocks 1115, 1116. In sub-frame 1120, the CBRU 1124 is spread over one resource block 1125. In sub-frame 1130, the CBRU 1134 is spread over four resource blocks 1135, 1136, 1137, 1138. In sub-frame 1140, the CBRU 1144 is spread over a partial resource block 1145. A partial resource block as used herein refers to less than a full resource block, e.g., fewer OFDM symbols in the time domain and/or fewer than 12 consecutive sub-carriers in the frequency domain. For example, the partial resource block 1145 uses 6 of the sub-carriers instead of 12 sub-carriers. In general one CBRU can be defined as a unit composed from the set of resource elements, over which the spreading is applied. For example, one CBRU may be at least one partial resource element such as shown by partial resource element 1145, one resource element such as shown by resource block 1125, a plurality of resource blocks as shown by resource blocks 1115, 1116, or by resource blocks 1135, 1136, 1137, 1138, or a combination of the above.

To improve coverage of low-cost MTC devices beyond coverage of LTE devices, the energy per information bit should be increased substantially. The energy from multiple consecutive sub-frames 1110, 1120, 1130, 1140, or frames which includes 10 of the sub-frames, is accumulated to increase the energy per transmitted information bit. However, MTC devices use very low data rates and are tolerable to latency. For instance, transmissions with 100 bytes/message with latency of up to 10 seconds are acceptable for MTC service in metering applications. These traffic characteristics can be exploited to improve coverage of MTC device at the expense of throughput.

Additional new transmission modes can be designed in LTE to boost system coverage in the order of 10-20 dB relative to existing coverage. From the physical layer perspective, substantial changes may be made in physical layer to boost coverage by tens of dB. The existing LTE physical frame structure and uplink (UL) and downlink (DL) modulations, e.g., Single Carrier Frequency Division Multiple Access (SC-FDMA) and Orthogonal Frequency-Division Multiple Access (OFDMA) respectively, may be followed as much as possible when boosting coverage. However, other embodiments may deviate from the ordinary LTE modulation and physical frame structure. Thus, the CBRU configurations 1100 are used to support a coverage boosting transmission mode (CBTM).

ADDITIONAL NOTES & EXAMPLES

Example 1 may include subject matter (such as a method or means for performing acts) including providing co-location information to user equipment to inform the user equipment of a configuration of a first reference signal and a configuration of a second reference signal co-located with the first reference signal and providing, to the user equipment, the first reference signal and the second reference signal co-located with the first reference signal for measuring carrier frequency offset by the user equipment.

Example 2 may optionally include the subject matter of Example 1, wherein the first reference signal is arranged to identify a data transmission for determining an associated carrier frequency offset and the second reference signal is arranged for measuring the carrier frequency offset of the data transmission identified by the first reference signal.

Example 3 may optionally include the subject matter of any one or more of Examples 1-2, wherein the providing the first reference signal comprises providing a user equipment-specific reference signal and the providing the second reference signal comprises providing a positioning reference signal.

Example 4 may optionally include the subject matter of any one or more of Examples 1-3, wherein the providing the user equipment-specific reference signal comprises providing a demodulation reference signal.

Example 5 may optionally include the subject matter of any one or more of Examples 1-4, wherein the providing the first and second reference signals comprises providing a first reference signal and a second reference signal mutable to prevent interference from other eNBs.

Example 6 may optionally include the subject matter of any one or more of Examples 1-5, wherein the providing the co-location information comprises using radio resource control signaling to indicate co-location of a channel state information reference signal and a positioning reference signal.

Example 7 may optionally include the subject matter of any one or more of Examples 1-6, wherein the providing the co-location information comprises providing an indication of co-location of the channel state information reference signal and a demodulation reference signal.

Example 8 may optionally include the subject matter of any one or more of Examples 1-7, wherein the providing the co-location information comprises providing an indication of co-location of the positioning reference signal and a demodulation reference signal.

Example 9 may optionally include the subject matter of any one or more of Examples 1-8, further comprising providing one or more third reference signals co-located with the second reference signal, wherein the providing the second reference signal and providing the one or more third reference signals comprises providing one or more inter-OFDM symbol separations between the second reference signal and the one or more third reference signals.

Example 10 may optionally include the subject matter of any one or more of Examples 1-9, wherein the providing the one or more third reference signals comprises providing two or more third reference signals and wherein the providing the one or more inter-OFDM symbol separations comprises providing two or more different inter-OFDM symbol separations.

Example 11 may optionally include the subject matter of any one or more of Examples 1-10, wherein the providing the one or more third reference signals comprises providing one or more copies of the second reference signal.

Example 12 may optionally include the subject matter of any one or more of Examples 1-11, wherein the providing the second reference signal and the providing the one or more third references signals comprises mapping the second reference signal and the one or more third reference signals in a physical resource block to one subcarrier.

Example 13 may optionally include the subject matter of any one or more of Examples 1-12, wherein the providing the first reference signal, the second reference signal and the one or more third reference signals comprises providing a demodulation reference signal, a first channel state information reference signal and a one or more second channel state information reference signals.

Example 14 may optionally include the subject matter of any one or more of Examples 1-13, wherein the providing the second reference signal comprises configuring the second reference signal as a channel state information reference signal transmitted from one antenna with no code division multiplexing to the second reference signal.

Example 15 may optionally include the subject matter of any one or more of Examples 1-14, further comprising receiving carrier frequency offset estimation from the user equipment based on the co-located first reference signal and at least one of the second reference signal and the one or more third reference signals.

Example 16 may include subject matter (such as a method or means for performing acts) including receiving at user equipment co-location information to inform the user equipment of a configuration of a first reference signal and a configuration of a second reference signal co-located with the first reference signal and receiving the first reference signal and the second reference signal co-located with the first reference signal for measuring carrier frequency offset by the user equipment.

Example 17 may optionally include the subject matter of Example 16, wherein the first reference signal is arranged to identify a data transmission for determining an associated carrier frequency offset and the second reference signal is arranged for measuring the carrier frequency offset of the data transmission identified by the first reference signal.

Example 18 may optionally include the subject matter of any one or more of Examples 16-17, wherein the receiving the first reference signal comprises receiving a user equipment-specific reference signal and the receiving the second reference signal comprises receiving a positioning reference signal.

Example 19 may optionally include the subject matter of any one or more of Examples 16-18, wherein the receiving the user equipment-specific reference signal comprises receiving a demodulation reference signal.

Example 20 may optionally include the subject matter of any one or more of Examples 16-19, wherein the receiving the first and second reference signals comprises receiving a first reference signal and a second reference signal mutable to prevent interference from other eNBs.

Example 21 may optionally include the subject matter of any one or more of Examples 16-20, wherein the receiving the co-location information comprises receiving radio resource control signaling to indicate co-location of a channel state information reference signal and a positioning reference signal.

Example 22 may optionally include the subject matter of any one or more of Examples 16-21, wherein the receiving the co-location information comprises receiving an indication of co-location of the channel state information reference signal and a demodulation reference signal.

Example 23 may optionally include the subject matter of any one or more of Examples 16-22, wherein the receiving the co-location information comprises receiving an indication of co-location of the positioning reference signal and a demodulation reference signal.

Example 24 may optionally include the subject matter of any one or more of Examples 16-23, further comprising receiving one or more third reference signals co-located with the second reference signal, wherein the receiving the second reference signal and receiving the one or more third reference signals comprises receiving the second reference signal and the one or more third reference signals with one or more inter-OFDM symbol separations between the second reference signal and the one or more third reference signals.

Example 25 may optionally include the subject matter of any one or more of Examples 16-24, wherein the receiving the one or more third reference signals comprises receiving two or more third reference signals and wherein the one or more inter-OFDM symbol separations comprises two or more different inter-OFDM symbol separations.

Example 26 may optionally include the subject matter of any one or more of Examples 16-25, wherein the receiving the one or more third reference signals comprises receiving one or more copies of the second reference signal.

Example 27 may optionally include the subject matter of any one or more of Examples 16-26, wherein the receiving the second reference signal and the receiving the one or more third references signals comprises receiving a physical resource block having the second reference signal and the one or more third reference signals mapped to one subcarrier.

Example 28 may optionally include the subject matter of any one or more of Examples 16-27, wherein the receiving the first reference signal, the second reference signal and the one or more third reference signals comprises receiving a demodulation reference signal, a first channel state information reference signal and a one or more second channel state information reference signals.

Example 29 may optionally include the subject matter of any one or more of Examples 16-28, wherein the receiving the second reference signal comprises receiving the second reference signal configured as a channel state information reference signal transmitted from one antenna with no code division multiplexing to the second reference signal.

Example 30 may optionally include the subject matter of any one or more of Examples 16-29, further comprising transmitting carrier frequency offset estimation from the user equipment based on the co-located first reference signal and at least one of the second reference signal and the one or more third reference signals.

Example 31 includes subject matter (such as a device, apparatus, client or system) for a node for providing frequency offset measurement enhancements, including a transceiver for receiving and transmitting signals and a processor, coupled to the transceiver, the processor arranged to provide co-location information to user equipment to inform the user equipment of a configuration of a first reference signal and a configuration of a second reference signal co-located with the first reference signal and provide, to the user equipment, the first reference signal and the second reference signal co-located with the first reference signal.

Example 32 may optionally include the subject matter of Example 31, wherein the first reference signal comprises a demodulation reference signal and the second reference signal comprises a positioning reference signal.

Example 33 may optionally include the subject matter of any one or more of Examples 31-32, wherein the processor is further arranged to provide one or more third reference signals co-located with the second reference signal, wherein the second reference signal and the one or more third reference signals are separated by one or more inter-OFDM symbol separations.

Example 34 may optionally include the subject matter of any one or more of Examples 31-33, wherein the one or more third reference signals comprises two or more third reference signals and wherein the one or more inter-OFDM symbol separations comprises two or more different inter-OFDM symbol separations.

Example 35 may optionally include the subject matter of any one or more of Examples 31-34, wherein the first reference signal, the second reference signal and the one or more third reference signals comprise a demodulation reference signal, a first channel state information reference signal and a one or more second channel state information reference signals respectively.

Example 36 may optionally include the subject matter of any one or more of Examples 31-35, wherein the processor receives a carrier frequency offset estimation from the user equipment based on the co-located first reference signal and at least one of the second reference signal and the one or more third reference signals.

Example 37 includes subject matter (such as a device, apparatus, client or system) for a user equipment, including a transceiver arranged to receive and transmit signals and a processor, coupled to the transceiver, the processor arranged to receive co-location information to inform the user equipment of a configuration of a first reference signal and a configuration of a second reference signal co-located with the first reference signal and the first reference signal and the second reference signal co-located with the first reference signal.

Example 38 may optionally include the subject matter of Example 37, wherein the first reference signal is arranged to identify a data transmission for determining an associated carrier frequency offset and the second reference signal is arranged for measuring the carrier frequency offset of the data transmission identified by the first reference signal.

Example 39 may optionally include the subject matter of any one or more of Examples 37-38, wherein the processor is further arranged to receive one or more third reference signals co-located with the second reference signal, the one or more third reference signals separated by one or more inter-OFDM symbol separations between the received second reference signal and the received one or more third reference signals.

Example 40 may optionally include the subject matter of any one or more of Examples 37-39, wherein the one or more third reference signals comprises two or more third reference signals and wherein the one or more inter-OFDM symbol separations comprises two or more different inter-OFDM symbol separations.

Example 41 may optionally include the subject matter of any one or more of Examples 37-40, wherein the first reference signal, the second reference signal and the one or more third reference signals further comprise a demodulation reference signal, a first channel state information reference signal and a or more second channel state information reference signals respectively.

Example 42 may optionally include the subject matter of any one or more of Examples 37-41, wherein the processor is further arranged to estimate a carrier frequency offset based on calculations using the co-located first reference signal and at least one of the second reference signal and the one or more third reference signals.

In Example 43 may include subject matter (such as means for performing acts or machine readable medium including instructions that, when executed by the machine, cause the machine to perform acts) including providing co-location information to user equipment to inform the user equipment of a configuration of a first reference signal and a configuration of a second reference signal co-located with the first reference signal and providing, to the user equipment, the first reference signal and the second reference signal co-located with the first reference signal for measuring carrier frequency offset by the user equipment.

In Example 44 the subject matter of Example 43 may optionally include, wherein the first reference signal is arranged to identify a data transmission for determining an associated carrier frequency offset and the second reference signal is arranged for measuring the carrier frequency offset of the data transmission identified by the first reference signal.

In Example 45 the subject matter of any one or more of Examples 43-44 may optionally include, wherein the providing the first reference signal comprises providing a user equipment-specific reference signal and the providing the second reference signal comprises providing a positioning reference signal.

In Example 46 the subject matter of any one or more of Examples 43-45 may optionally include, wherein the providing the user equipment-specific reference signal comprises providing a demodulation reference signal.

In Example 47 the subject matter of any one or more of Examples 43-46 may optionally include, wherein the providing the first and second reference signals comprises providing a first reference signal and a second reference signal mutable to prevent interference from other eNBs.

In Example 48 the subject matter of any one or more of Examples 43-47 may optionally include, wherein the providing the co-location information comprises using radio resource control signaling to indicate co-location of a channel state information reference signal and a positioning reference signal.

In Example 49 the subject matter of any one or more of Examples 43-48 may optionally include, wherein the providing the co-location information comprises providing an indication of co-location of the channel state information reference signal and a demodulation reference signal.

In Example 50 the subject matter of any one or more of Examples 43-49 may optionally include, wherein the providing the co-location information comprises providing an indication of co-location of the positioning reference signal and a demodulation reference signal.

In Example 51 the subject matter of any one or more of Examples 43-50 may optionally further comprising providing one or more third reference signals co-located with the second reference signal, wherein the providing the second reference signal and providing the one or more third reference signals comprises providing one or more inter-OFDM symbol separations between the second reference signal and the one or more third reference signals.

In Example 52 the subject matter of any one or more of Examples 43-51 may optionally include, wherein the providing the one or more third reference signals comprises providing two or more third reference signals and wherein the providing the one or more inter-OFDM symbol separations comprises providing two or more different inter-OFDM symbol separations.

In Example 53 the subject matter of any one or more of Examples 43-52 may optionally include, wherein the providing the one or more third reference signals comprises providing one or more copies of the second reference signal.

In Example 54 the subject matter of any one or more of Examples 43-53 may optionally include, wherein the providing the second reference signal and the providing the one or more third references signals comprises mapping the second reference signal and the one or more third reference signals in a physical resource block to one subcarrier.

In Example 55 the subject matter of any one or more of Examples 43-54 may optionally include, wherein the providing the first reference signal, the second reference signal and the one or more third reference signals comprises providing a demodulation reference signal, a first channel state information reference signal and a one or more second channel state information reference signals.

In Example 56 the subject matter of any one or more of Examples 43-55 may optionally include, wherein the providing the second reference signal comprises configuring the second reference signal as a channel state information reference signal transmitted from one antenna with no code division multiplexing to the second reference signal.

In Example 57 the subject matter of any one or more of Examples 43-56 may optionally include further comprising receiving carrier frequency offset estimation from the user equipment based on the co-located first reference signal and at least one of the second reference signal and the one or more third reference signals.

In Example 58 may include subject matter (such as means for performing acts or machine readable medium including instructions that, when executed by the machine, cause the machine to perform acts) including receiving at user equipment co-location information to inform the user equipment of a configuration of a first reference signal and a configuration of a second reference signal co-located with the first reference signal and receiving the first reference signal and the second reference signal co-located with the first reference signal for measuring carrier frequency offset by the user equipment.

In Example 59 the subject matter of Example 58 may optionally include, wherein the first reference signal is arranged to identify a data transmission for determining an associated carrier frequency offset and the second reference signal is arranged for measuring the carrier frequency offset of the data transmission identified by the first reference signal.

In Example 60 the subject matter of any one or more of Examples 58-59 may optionally include, wherein the receiving the first reference signal comprises receiving a user equipment-specific reference signal and the receiving the second reference signal comprises receiving a positioning reference signal.

In Example 61 the subject matter of any one or more of Examples 58-60 may optionally include, wherein the receiving the user equipment-specific reference signal comprises receiving a demodulation reference signal.

In Example 62 the subject matter of any one or more of Examples 58-61 may optionally include, wherein the receiving the first and second reference signals comprises receiving a first reference signal and a second reference signal mutable to prevent interference from other eNBs.

In Example 63 the subject matter of any one or more of Examples 58-62 may optionally include, wherein the receiving the co-location information comprises receiving radio resource control signaling to indicate co-location of a channel state information reference signal and a positioning reference signal.

In Example 64 the subject matter of any one or more of Examples 58-63 may optionally include, wherein the receiving the co-location information comprises receiving an indication of co-location of the channel state information reference signal and a demodulation reference signal.

In Example 65 the subject matter of any one or more of Examples 58-64 may optionally include, wherein the receiving the co-location information comprises receiving an indication of co-location of the positioning reference signal and a demodulation reference signal.

In Example 66 the subject matter of any one or more of Examples 58-65 may optionally further comprising receiving one or more third reference signals co-located with the second reference signal, wherein the receiving the second reference signal and receiving the one or more third reference signals comprises receiving the second reference signal and the one or more third reference signals with one or more inter-OFDM symbol separations between the second reference signal and the one or more third reference signals.

In Example 67 the subject matter of any one or more of Examples 58-66 may optionally include, wherein the receiving the one or more third reference signals comprises receiving two or more third reference signals and wherein the one or more inter-OFDM symbol separations comprises two or more different inter-OFDM symbol separations.

In Example 68 the subject matter of any one or more of Examples 58-67 may optionally include, wherein the receiving the one or more third reference signals comprises receiving one or more copies of the second reference signal.

In Example 69 the subject matter of any one or more of Examples 58-68 may optionally include, wherein the receiving the second reference signal and the receiving the one or more third references signals comprises receiving a physical resource block having the second reference signal and the one or more third reference signals mapped to one subcarrier.

In Example 70 the subject matter of any one or more of Examples 58-69 may optionally include, wherein the receiving the first reference signal, the second reference signal and the one or more third reference signals comprises receiving a demodulation reference signal, a first channel state information reference signal and a one or more second channel state information reference signals.

In Example 71 the subject matter of any one or more of Examples 58-70 may optionally include, wherein the receiving the second reference signal comprises receiving the second reference signal configured as a channel state information reference signal transmitted from one antenna with no code division multiplexing to the second reference signal.

In Example 72 the subject matter of any one or more of Examples 58-71 may optionally further comprising transmitting carrier frequency offset estimation from the user equipment based on the co-located first reference signal and at least one of the second reference signal and the one or more third reference signals.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, also contemplated are examples that include the elements shown or described. Moreover, also contemplate are examples using any combination or permutation of those elements shown or described (or one or more aspects thereof), either with respect to a particular example (or one or more aspects thereof), or with respect to other examples (or one or more aspects thereof) shown or described herein.

Publications, patents, and patent documents referred to in this document are incorporated by reference herein in their entirety, as though individually incorporated by reference. In the event of inconsistent usages between this document and those documents so incorporated by reference, the usage in the incorporated reference(s) are supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to suggest a numerical order for their objects.

The above description is intended to be illustrative, and not restrictive. For example, the above-described examples (or one or more aspects thereof) may be used in combination with others. Other embodiments may be used, such as by one of ordinary skill in the art upon reviewing the above description. The Abstract is to allow the reader to quickly ascertain the nature of the technical disclosure, for example, to comply with 37 C.F.R. §1.72(b) in the United States of America. It is submitted with the understanding that it will not be used to interpret or limit the scope or meaning of the claims. Also, in the above Detailed Description, various features may be grouped together to streamline the disclosure. However, the claims may not set forth features disclosed herein because embodiments may include a subset of said features. Further, embodiments may include fewer features than those disclosed in a particular example. Thus, the following claims are hereby incorporated into the Detailed Description, with a claim standing on its own as a separate embodiment. The scope of the embodiments disclosed herein is to be determined with reference to the appended claims, along with the full scope of equivalents to which such claims are entitled.

What is claimed is:

1. A method for providing frequency offset measurement enhancements, comprising:
   providing co-location information to user equipment to inform the user equipment of a configuration of a first reference signal and a configuration of a second reference signal co-located with the first reference signal; and
   providing, to the user equipment, the first reference signal and the second reference signal co-located with the first reference signal for measuring carrier frequency offset by the user,
   wherein the second reference signal is co-located with the first reference signal in the same sub-carrier in a frequency domain, and the second reference signal is co-located adjacent with the first reference signal in a time domain.

2. The method of claim 1, wherein the first reference signal is arranged to identify a data transmission for determining an associated carrier frequency offset and the second reference signal is arranged for measuring the carrier frequency offset of the data transmission identified by the first reference signal.

3. The method of claim 1, wherein the providing the first reference signal comprises providing a user equipment-specific reference signal and the providing the second reference signal comprises providing a positioning reference signal or a second reference signal mutable to prevent interference from other eNBs.

4. The method of claim 3, wherein the providing the user equipment-specific reference signal comprises providing a demodulation reference signal.

5. The method of claim 1, wherein the providing the co-location information comprises one selected from:
   using radio resource control signaling to indicate co-location of a channel state information reference signal and a positioning reference signal;
   providing an indication of co-location of the channel state information reference signal and a demodulation reference signal; and providing an indication of co-location of the positioning reference signal and a demodulation reference signal.

6. The method of claim 1 further comprising providing one or more third reference signals co-located with the second reference signal, wherein the providing the second reference signal and providing the one or more third reference signals comprises providing one or more inter-OFDM symbol separations between the second reference signal and the one or more third reference signals.

7. The method of claim 6, wherein the providing the one or more third reference signals comprises one selected from:
providing two or more third reference signals and wherein the providing the one or more inter-OFDM symbol separations comprises providing two or more different inter-OFDM symbol separations; and
providing one or more copies of the second reference signal.

8. The method of claim 6, wherein the providing the second reference signal and the providing the one or more third references signals comprises mapping the second reference signal and the one or more third reference signals in a physical resource block to one subcarrier.

9. The method of claim 6, wherein the providing the first reference signal, the second reference signal and the one or more third reference signals comprises providing a demodulation reference signal, a first channel state information reference signal and one or more second channel state information reference signals.

10. The method of claim 6 further comprising receiving carrier frequency offset estimation from the user equipment based on the co-located first reference signal and at least one of the second reference signal and the one or more e third reference signals.

11. A method for providing frequency offset measurement enhancements, comprising:
receiving at user equipment co-location information to inform the user equipment of a configuration of a first reference signal and a configuration of a second reference signal co-located with the first reference signal; and
receiving the first reference signal and the second reference signal co-located with the first reference signal for measuring carrier frequency offset by the user equipment,
wherein the second reference signal is co-located with the first reference signal in the same sub-carrier in a frequency domain, and the second reference signal is co-located adjacent with the first reference signal in a time domain.

12. The method of claim 11, wherein the first reference signal is arranged to identify a data transmission for determining an associated carrier frequency offset and the second reference signal is arranged for measuring the carrier frequency offset of the data transmission identified by the first reference signal.

13. The method of claim 11, wherein the receiving the first reference signal comprises receiving a user equipment-specific reference signal and the receiving the second reference signal comprises one selected from:
receiving a positioning reference signal;
receiving a second reference signal mutable to prevent interference from other eNBs; and
receiving a physical resource block having the second reference signal.

14. The method of claim 11, wherein the receiving the co-location information comprises one selected from:
receiving radio resource control signaling to indicate co-location of a channel state information reference signal and a positioning reference signal;
receiving an indication of co-location of the channel state information reference signal and a demodulation reference signal; and
receiving an indication of co-location of the positioning reference signal and a demodulation reference signal.

15. The method of claim 11 further comprising receiving one or more third reference signals co-located with the second reference signal, wherein the receiving the second reference signal and receiving the one or more third reference signals comprises receiving the second reference signal and the one or more third reference signals with one or more inter-OFDM symbol separations between the second reference signal and the one or more third reference signals.

16. The method of claim 15, wherein the receiving the one or more third reference signals comprises one selected from:
receiving two or more third reference signals and wherein the one or more inter-OFDM symbol separations comprises two or more different inter-OFDM symbol separations;
receiving one or more copies of the second reference signal; and receiving one or more third reference signals mapped to one subcarrier.

17. The method of dam 11, wherein the receiving the first reference signal, the second reference signal and the one or more third reference signals comprises receiving a demodulation reference signal, a first channel state information reference signal and one or more second channel state information reference signals.

18. The method of claim 11, wherein the receiving the second reference signal comprises receiving the second reference signal configured as a channel state information reference signal transmitted from one antenna with no code division multiplexing to the second reference signal.

19. The method of claim 11 further comprising transmitting carrier frequency offset estimation from the user equipment based on the co-located first reference signal and at least one of the second reference signal and the one or more third reference signals.

20. A node for providing frequency offset measurement enhancements, comprising:
a transceiver for receiving and transmitting signals; and
a processor, coupled to the transceiver, the processor arranged to:
provide co-location information to user equipment to inform the user equipment of a configuration of a first reference signal and a configuration of a second reference signal co- located with the first reference signal; and
provide, to the user equipment, the first reference signal and the second reference signal co-located with the first reference signal for measuring carrier frequency offset by the user equipment,
wherein the second reference signal is co-located with the first reference signal in the same sub-carrier in a frequency domain, and the second reference signal is co-located adjacent with the first reference signal in a time domain.

21. The node of claim 20, wherein the first reference signal comprises a demodulation reference signal and the second reference signal comprises one selected from a positioning reference signal and a first channel state information reference signal, wherein the processor is further arranged to provide one or more third reference signals co-located with the second reference signal, the second reference signal and the one or more third reference signals being separated by one or more inter-OFDM symbol separations, and wherein the one or more third reference signals comprises one or more second channel state information reference signals.

22. The node of claim 21, wherein the one or more third reference signals comprises two or more third reference signals and wherein the one or more inter-OFDM symbol separations comprises two or more different inter-OFDM symbol separations.

23. The node of claim 21, wherein the processor receives a carrier frequency offset estimation from the user equipment based on the co-located first reference signal and at least one of the second reference signal and the one or more third reference signals.

24. A user equipment (UE) for providing frequency offset measurement enhancements, comprising:
    a transceiver arranged to receive and transmit signals; and
    a processor, coupled to the transceiver, the processor arranged to receive:
        co-location information to inform the user equipment of a configuration of a first reference signal and a configuration of a second reference signal co-boated with the first reference signal; and
        the first reference signal and the second reference signal co-located with the first reference signal for measuring carrier frequency offset by the user equipment,
    wherein the second reference signal is co-located with the first reference signal in the same sub-carrier in a frequency domain, and the second reference signal is co-located adjacent with the first reference signal in a time domain.

25. The user equipment of claim 24, wherein the first reference signal is arranged to identify a data transmission for determining an associated carrier frequency offset and the second reference signal is arranged for measuring the carrier frequency offset of the data transmission.

26. The user equipment of claim 24, wherein the processor is further arranged to receive one or more third reference signals co-located with the second reference signal, the one or more third reference signals separated by one or more inter-OFDM symbol separations between the received second reference signal and the received one or more third reference signals.

27. The user equipment of claim 26, wherein the one or more third reference signals comprises two or more third reference signals and wherein the one or more inter-OFDM symbol separations comprises two or more different inter-OFDM symbol separations.

28. The user equipment of claim 26, wherein the first reference signal comprises a demodulation reference signal, the second reference signal comprises a first channel state information reference signal and wherein the one or more third reference signals comprise one or more second channel state information reference signals.

29. The user equipment of claim 26, wherein the processor is further arranged to estimate a carrier frequency offset based on calculations using the co-located first reference signal and at least one of the second reference signal and the one or more third reference signals.

* * * * *

UNITED STATES PATENT AND TRADEMARK OFFICE
CERTIFICATE OF CORRECTION

PATENT NO. : 9,332,469 B2
APPLICATION NO. : 14/125767
DATED : May 3, 2016
INVENTOR(S) : Davydov et al.

Page 1 of 1

It is certified that error appears in the above-identified patent and that said Letters Patent is hereby corrected as shown below:

On the title page

Item 71 in "Applicants", in column 1, line 1-10, delete "Applicants: Alexei Vladiminovich Davydov, Nizhny Novgorod (RU); Gregory Vladimirovich Morozov, Nizhny Novgorod (RU); Seunghee Han, Kyoungkido (KR); Alexander Alexandrovich Maltsev, Nizhny Novgorod (RU); Ilya Bolotin, Nizhny Novgorod (RU); Vadim Sergeyevich Sergeyev, Nizhny (RU); Jong-Kae Fwu, Sunnyvale, CA (US)" and insert --Applicant: Intel Corporation, Santa Clara, CA (US)--, therefor Item 72 in "Inventors", in column 1, line 5, delete "Nizhny" and insert --Nizhny Novgorod--, therefor Item 72 in "Inventors", in column 1, line 9, before "Kyoungkido", insert --Anyangshi,--, therefor In the claims In column 18, line 39, in Claim 1, delete "user," and insert --user equipment,--, therefor In column 19, line 32, in Claim 10, before "third", delete "e", therefor In column 20, line 24, in Claim 17, delete "dam" and insert --claim--, therefor In column 20, line 52-53, in Claim 20, delete "signal for measuring carrier frequency offset by the user equipment," and insert --signal,--, therefor In column 21, line 20, in Claim 24, delete "co-boated" and insert --co-located--, therefor In column 21, line 23-24, in Claim 24, delete "signal for measuring carrier frequency offset by the user equipment," and insert --signal,--, therefor Signed and Sealed this
Twenty-third Day of August, 2016

Michelle K. Lee
*Director of the United States Patent and Trademark Office*